(12) United States Patent
Ashida et al.

(10) Patent No.: US 7,760,604 B2
(45) Date of Patent: Jul. 20, 2010

(54) OPTICAL DISC DEVICE AND TRACKING CONTROL METHOD

(75) Inventors: Akihiro Ashida, Urayasu (JP); Kikuo Shimizu, Kawasaki (JP); Motoyuki Suzuki, Yokohama (JP)

(73) Assignee: Hitachi-LG Data Storage Inc., Tokyo (JP)

( * ) Notice: Subject to any disclaimer, the term of this patent is extended or adjusted under 35 U.S.C. 154(b) by 511 days.

(21) Appl. No.: 11/892,807

(22) Filed: Aug. 27, 2007

(65) Prior Publication Data

US 2008/0123494 A1  May 29, 2008

(30) Foreign Application Priority Data

Nov. 29, 2006  (JP)  ............................. 2006-322138

(51) Int. Cl.
*G11B 7/00* (2006.01)

(52) U.S. Cl. .................................. 369/53.23; 369/53.18

(58) Field of Classification Search .................. None
See application file for complete search history.

(56) References Cited

U.S. PATENT DOCUMENTS

| | | | |
|---|---|---|---|
| 7,142,485 B2 * | 11/2006 | Nishida et al. | 369/44.28 |
| 7,190,644 B2 * | 3/2007 | Shen | 369/44.28 |
| 7,349,296 B2 * | 3/2008 | Akkermans et al. | 369/44.25 |
| 7,668,050 B2 * | 2/2010 | Lin et al. | 369/44.25 |

FOREIGN PATENT DOCUMENTS

JP  2004-310911  11/2004

* cited by examiner

*Primary Examiner*—Joseph H Feild
*Assistant Examiner*—Joseph Haley
(74) *Attorney, Agent, or Firm*—McDermott Will & Emery LLP

(57) ABSTRACT

This invention provides an optical disc device that can prevent the occurrence of an error in a starting position of a write operation due to off-tracking, and to avoid an unnecessary stop of the write operation during writing. A tracking error signal generator generates a tracking error signal from a signal which has been detected by an optical pickup, and a system controller detects off-tracking by comparing the tracking error signal with a threshold level, and turns control operation of a tracking servo controller off if the threshold level is exceeded. The off-tracking detection threshold level applied during a time period from completion of seek operation to a start of movement of the optical pickup to the starting position of the write operation is set to be lower than a threshold level applied during a time period of data recording.

5 Claims, 4 Drawing Sheets

OPTICAL DISC DEVICE AND TRACKING CONTROL METHOD

CLAIM OF PRIORITY

The present application claims priority from Japanese application serial No. JP 2006-322138, filed on Nov. 29, 2006, the content of which is incorporated by reference into this application.

BACKGROUND OF THE INVENTION

1. Field of the Invention

The present invention relates to an optical disc device for recording data on a recordable optical disc. The invention also relates to a tracking control method.

2. Description of the Related Art

For current optical disc devices, during data recording on a recordable optical disc (such as a CD or a DVD), there is a need to prevent erroneous erasure of recorded data from adjacent tracks due to a tracking servo control error (hereinafter, called 'off-servo' or 'off-tracking'). Accordingly, these devices have a function that monitors the amplitude of tracking error (TE) signals and if a TE amplitude threshold level is exceeded for a predetermined time, judges off-tracking to have occurred, and conducts a process, for example, to immediately stop the recording operation.

With regards to the threshold level for the off-tracking judgment in the above case, a trifle high level is assigned for DVD-R's and other discs on which data can be recorded one time only. Otherwise, abortion of the recording operation in progress will make the disc itself no more usable. This is why the high threshold level is assigned to prevent off-tracking from being detected more often than necessary. An independent threshold level is assigned for off-tracking detection during playback. For example, since playback, unlike recording, can be easily retried, a threshold level lower than that of off-tracking detection during recording is assigned for easier detection of off-tracking. Conversely in some cases, the threshold level for off-tracking detection during playback is higher than that of off-tracking detection during recording.

After receiving a recording command, such an optical disc device moves an optical head to the vicinity of a recording position on the disc during seek operation, then moves the head to the starting position of recording, and starts to record data. The device detects the starting position of recording, by reading a recording start address from a wobble signal (or the like) provided on the recording disc. During this reading operation, the device uses a common threshold level to detect off-tracking.

In addition, with the progress of high-speed recording by optical disc devices, there is a need to build in an off-tracking detection function more efficiently. For example, JP-A-2004-310911 discloses a device having servo-off detection means and adapted so that even when the servo-off detection means is effective, the device can rapidly start recording and so that even during recording, the device is able to sense an off-servo error in advance and to record data at high speed without causing off-servo. Hence, the device classifies servo signal error counts according to threshold level and selects the optimal recording speed for the particular error level of the servo signal.

SUMMARY OF THE INVENTION

In the conventional technique described above, after the optical head has been moved to the starting position of recording on the disc, when data is recorded, off-tracking is detected using one common threshold level. However, there are the following problems:

First during recording, even a temporary change in TE signal level due to local nonlinearity of a track on the disc, or even a TE signal level disturbance due to a very small defect present on the disc is occasionally detected as off-tracking. For this reason, an unnecessary stop of recording could affect the recording operation. Such an unnecessary stop of recording easily occurs for low-price low-quality discs, in particular.

After the optical head has been moved to the vicinity of the starting position of data recording on the disc during seek operation, off-tracking judgments also occur during the rotational (recording) latency period required for more accurate movement of the disc to the starting position of recording. In this case, however, local nonlinearity of a track on the disc could cause temporary off-tracking, thus resulting in the head being unintentionally moved to another track and the recording operation being started from the wrong position. If this event happens near the disc management region, in particular, the entire disc will become unusable and fatal.

Even with the conventional method, it is impossible to detect these off-tracking errors during recording or during the latency period at the starting position of recording, by using a common threshold level, and detection requests relating to the two errors cannot be satisfied. These problems associated with the servo control during the latency period at the starting position of recording are not considered in JP-A-2004-310911.

An object of the present invention is to provide an optical disc device and tracking control method adapted to prevent an error in a recording start position due to off-tracking from occurring, and to avoid an unnecessary stop of recording operation during recording.

An optical disc device of the present invention includes: a spindle motor that rotates an optical disc; an optical pickup that irradiates the optical disc with laser light and detects the light reflected from the optical disc; a tracking error signal generator that generates a tracking error signal from a signal detected by the optical pickup; a tracking servo controller that controls tracking of the optical pickup on the basis of the tracking error signal; and a system controller that detects off-tracking by comparing the tracking error signal with a threshold level and turns off control operation of the tracking servo controller if the threshold level is exceeded.

The threshold level for off-tracking detection that the system controller applies during a time period from completion of seek operation to a start of movement of the optical pickup to a starting position of recording is set to be lower than a threshold level applied during a time period of data recording.

The threshold level for off-tracking detection includes a voltage threshold level for comparing a voltage value of the tracking error signal, and a time threshold for comparing a span of a time for which the voltage value exceeds a predetermined voltage.

A tracking control method of the present invention includes: acquiring a tracking error signal from light reflected from an optical disc; detecting off-tracking by comparing the acquired tracking error signal with a threshold level; and turning tracking servo control off if the threshold level is exceeded.

The off-tracking detection threshold level applied during a time period from completion of seek operation to a start of movement of an optical pickup to a starting position of recording is set to be lower than a threshold level applied during a time period of data recording.

According to the present invention, an optical disc device can be improved in reliability and operational convenience by preventing the occurrence of an error in a recording start position due to off-tracking, and avoiding an unnecessary stop of recording operation during recording.

BRIEF DESCRIPTION OF THE DRAWINGS

These and other features, objects and advantages of the present invention will become more apparent from the following description when taken in conjunction with the accompanying drawings, wherein.

DETAILED DESCRIPTION OF THE EMBODIMENTS

Figure 1:
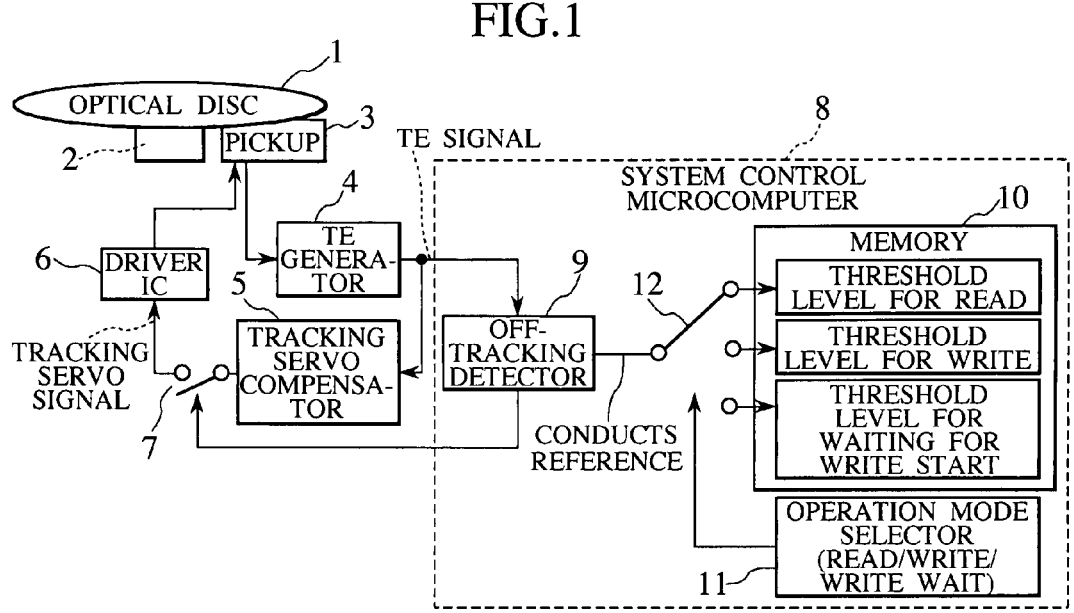
FIG. 1 is a block diagram showing an embodiment of an optical disc device according to the present invention.

FIG. 1 is a block diagram showing an embodiment of an optical disc device according to the present invention. An optical disc 1 is, for example, a DVD-R (Digital Versatile Disc-Recordable), a DVD-RW (Digital Versatile Disc-Rewritable), or any other recording medium onto which data can be written. A spindle motor 2 rotationally drives mounted optical disc 1. An optical pickup 3 irradiates a recording surface of the optical disc 1 with laser light which has been generated by a laser light source (semiconductor laser), and reads or writes data. The optical pickup 3, when driven by a sled mechanism not shown, moves to seek for a desired track position on the optical disc 1.

The optical pick 3 uses an optical detector to detect light which is reflected from the optical disc 1, and a tracking error signal generator (TE generator) 4 generates from the detected optical signal a tracking error (TE) signal based on a push-pull method or the like. A tracking servo compensator 5 generates a tracking servo signal whose gain and phase are compensated on the basis of the TE signal. A driver IC 6 implements tracking control for the desired track by driving an actuator of an objective lens of the optical pickup 3 on the basis of the servo signal.

Meanwhile, a system control microcomputer 8 monitors amplitude of the TE signal sent from the TE generator 4, and detects off-tracking. If off-tracking is judged to be occurring, the system control microcomputer 8 turns a switch 7 off to stop the read or write operation as well as to shut off an output provided from the tracking servo compensator 5.

The system control microcomputer 8 includes an off-tracking detector 9, a memory 10, an operation mode selector 11, and a selector switch 12. The off-tracking detector 9 compares the amplitude of the TE signal with an amplitude threshold level. After measuring a span of a time for which the amplitude threshold level is exceeded, the off-tracking detector 9 also compares the measured time with a time threshold. If the measured time is less than the time threshold, the off-tracking detector 9 turns on the switch 7. If the time threshold is exceeded, the off-tracking detector 9 judges off-tracking to have occurred, and conducts control to turn off the switch 7. The memory 10 contains the threshold levels that the off-tracking detector 9 uses, and an appropriate value is assigned to each of these threshold levels according to a particular operation mode (read, write, or wait for writing). The operation mode selector 11 undertakes selection control of the operation mode (read, write, or wait for writing). The selector switch 12 selects the appropriate threshold level from the memory 10 according to the selected operation mode.

The optical disc device of the present embodiment is constructed so that during the detection of off-tracking, the threshold levels to become judgment criteria are appropriately selected according to the particular operation mode of the device. That is to say, a value is assigned as the threshold level applied during a moving time period (waiting time period for a start of recording) from completion of the optical pickup seek operation to a start of the movement to a starting position of data writing (recording), and a different value is assigned as the threshold level applied during a writing time period or a, reading (playback) time period. In addition, the threshold level applied during the waiting time period for the start of writing is set to be lower than the threshold level applied during the read/write operation. Setting the two threshold levels in this fashion makes it possible to prevent an error in the write operation starting position due to off-tracking from occurring, and to avoid an unnecessary stop of the write operation in progress.

Figure 2:
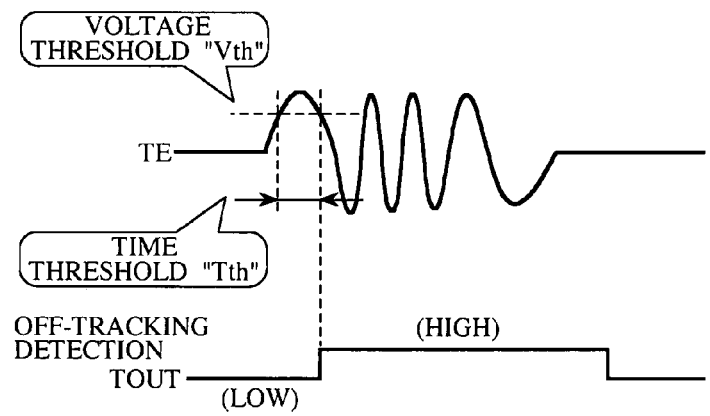
FIG. 2 is a diagram that illustrates operation of an off-tracking detector.

FIG. 2 is a diagram that illustrates operation of the off-tracking detector 9. A tracking error signal TE is input from the TE signal generator 4 to the off-tracking detector 9. The off-tracking detector 9 then compares the signal TE with at least one of two threshold levels, namely, a voltage threshold level "Vth" or a time threshold "Tth" of a time for which the voltage of the TE signal exceeds a predetermined voltage value. An example of comparing the amplitude at one side of the above TE signal with both "Vth" and "Tth" is shown in FIG. 2. If the TE amplitude exceeds "Vth" and the time for which "Vth" has been exceeded is longer than the time threshold "Tth", the off-tracking detector 9 judges off-tracking to have occurred. After the judgment, the off-tracking detector 9 generates an off-tracking detection signal TOUT, that is, changes the TOUT signal to a 'Hi' (high) state, and then supplies the signal to the switch 7. The switch 7 then turns tracking servo control off by shutting off the signal supplied from the tracking servo compensator 5.

If tracking shifts to an adjacent track, the TE signal oscillates into a sine waveform and the signal level increases at both plus and negative sides. During off-tracking detection, therefore, amplitude levels at both sides of the TE signal may be compared with the threshold levels, and this makes reliable detection of off-tracking possible.

Figure 3:
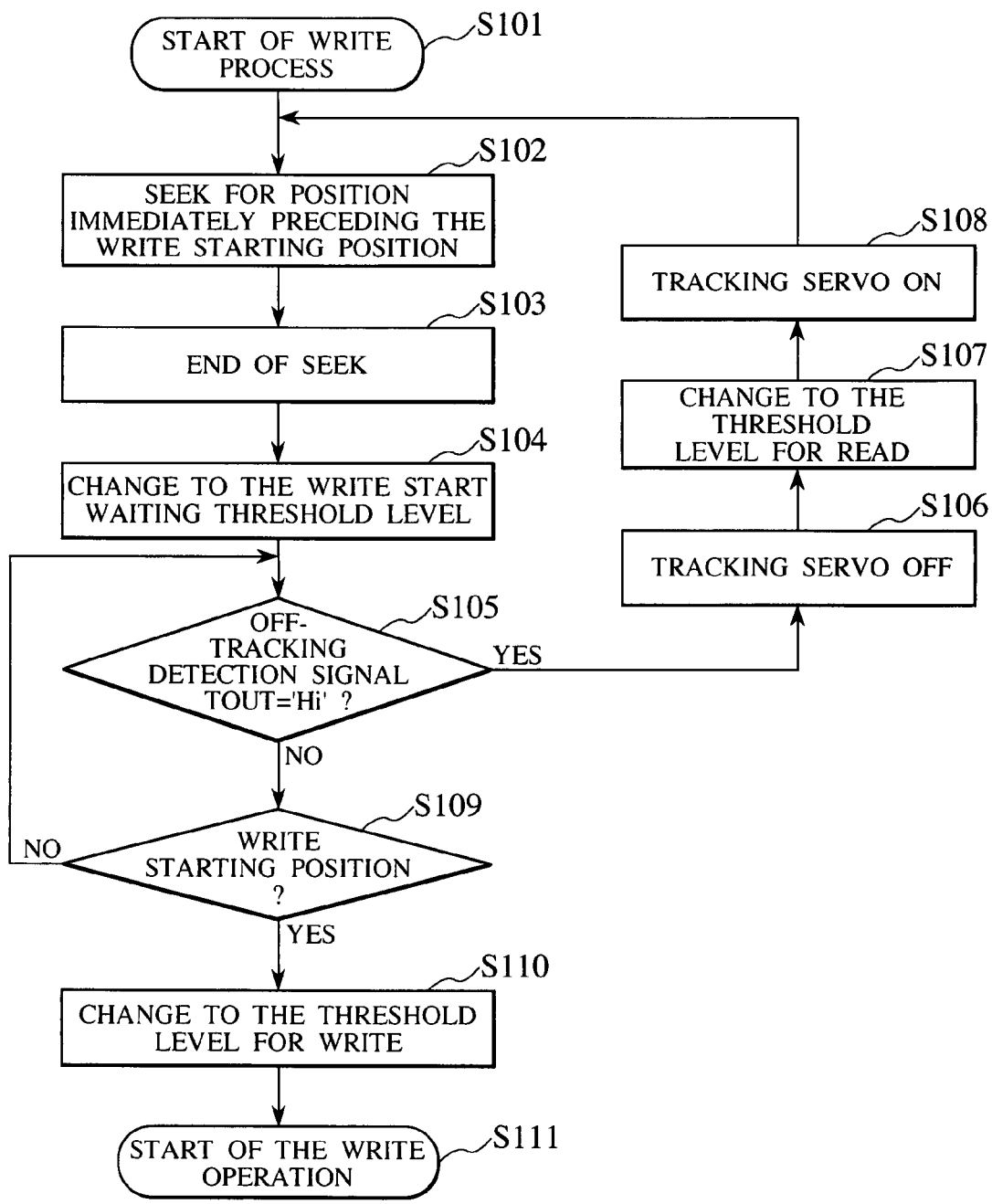
FIG. 3 is a flowchart showing a flow of a write process in the embodiment.

FIG. 3 is a flowchart showing a flow of a write process in the embodiment. In step S101, the optical disc device receives a data-recording (Write) instruction. At this time, detection thresholds are already assigned to the off-tracking detector as initial threshold levels for playback (Read).

In step S102, in order to start the write operation, SEEK operation is conducted to move the optical pickup to a position immediately preceding the write starting position on the disc. During the SEEK operation, a traverse of a track generates a TE signal of a sine waveform. During this time period, since off-tracking detection is unnecessary, a process such as temporary masking of signal output is conducted.

In step S103, the SEEK operation is ended. During the end of the SEEK operation, the fact that the optical pickup has moved through a predetermined distance can be detected by, for example, counting the number of sine waves generated by traverses of tracks.

In step S104, the threshold levels that the off-tracking detector applies are changed to the threshold levels used during the waiting time for the start of the write operation. These threshold levels used during the waiting time for the start of the write operation are set to be lower than the threshold levels used for the read or write operation.

In step S105, while following tracks on the disc, the optical pickup moves until the starting position of the write operation has been reached. During this time, the off-tracking detector detects off-tracking by comparing the TE signal with the threshold levels used for the waiting time for the start of the write operation. If the TE signal is in excess of the threshold levels, process control proceeds to step S106 to make the device prepare for a retrial of seek operation.

In step S106, the switch 7 is disconnected and tracking servo control is turned off.

In step S107, the threshold levels that the off-tracking detector applies are changed to the threshold levels used for the read operation.

In step S108, the switch 7 is reconnected and tracking servo control is turned back on. After this, the optical pickup is returned to the starting position of the seek operation and then the seek operation is restarted in step S102.

If off-tracking is not detected in step S105, whether the pickup has arrived at the starting position of the write operation is judged in step S109. The starting position of the write operation is detected by reading a starting address of the write operation from a wobble signal (or the like) provided on the disc. Alternatively, the detection may use an interpolation address or a method of predicting the time required for the arrival at the starting position of the write operation.

In step S110, when the starting position of the write operation is reached, the threshold levels that the off-tracking detector applies are changed to the threshold levels used for the write operation. When the starting position of the write operation is reached, a logic signal such as a write gating (WGATE) signal changes in state, so the threshold levels may be changed synchronously with this signal.

In step S111, the data write operation is started. During this write time, off-tracking is detected using the write threshold levels that were selected by the setting change in step S110.

Here is a supplementary description of the waiting operation in step S105 for the start of writing:

The starting position of writing is basically detectable by reading the current position address from the wobble signal (or the like) provided on the disc. However, as the reading speed is increased, a delay in processing may result from reading from address information or a decrease in reliability may arise from reading the address information from the wobble signal. In these cases, therefore, an alternative method is employed that does not depend upon any information present on the disc. The alternative method here would be, for example, to index the optical pickup to the starting position of the write operation by using an interpolation address generated inside the device, or to arithmetically predict, from the address information at the seek destination and from a rotating speed of the disc, the time required for the arrival at the starting position of writing. For these reasons, in the event of temporary off-tracking occurring during the rotational latency time from the arrival at the seek destination to the movement to the starting position of writing, even if the optical pickup is unintentionally moved to an different track, the write operation is likely to be started from the wrong position on the disc without noticing such an unusual event.

In the present embodiment, as in step S104, the threshold levels for off-tracking detection during the time period from the end of the seek operation to movement to the starting position of writing are each assigned a small value so that off-tracking can be reliably detected. Thus, the starting position of writing becomes unlikely to be mistaken. The threshold levels for off-tracking detection during the write operation, on the other hand, are each assigned a large value as in step S110, so it is possible to prevent an unnecessary stop of the write operation due to very small surface defects on the disc.

Figure 4:
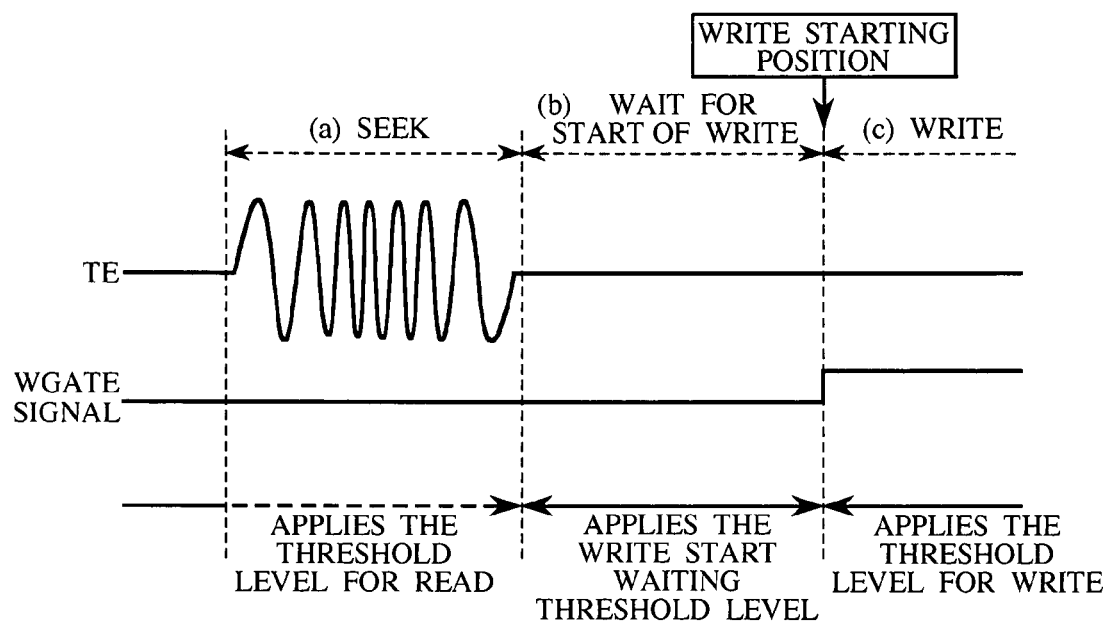
FIG. 4 is a diagram that shows a setting change of a threshold level in the off-tracking detector.

FIG. 4 is a diagram that shows a setting change of the detection threshold levels in the off-tracking detector. During this change, the operation mode selector 11 operates the select switch 12 and selects the threshold levels for each operation mode stored in the memory 10.

In the operating time period of operation mode SEEK (a), the threshold levels for the read operation are applied. During the seek operation, however, since detection of the off-track state itself is unnecessary, an output signal associated therewith is masked. During the write start waiting time period of operation mode (b), the threshold levels for the waiting time period for the start of the write operation are applied. During a change from mode (a) to mode (b), disappearance of the TE signal sine waveform amplitude, gated with the end of the seek operation, is detected using off-tracking detection. For example, if the TE signal does not exceed a voltage threshold level of 50% for a predetermined period of 300 μsec, it is judged that the seek operation has ended and that the disc has changed to the write start waiting state (tracking ON). Operation mode (c) relates to the operating time period of the write operation, and the threshold levels for the write operation are applied during this time period.

Figure 5A:
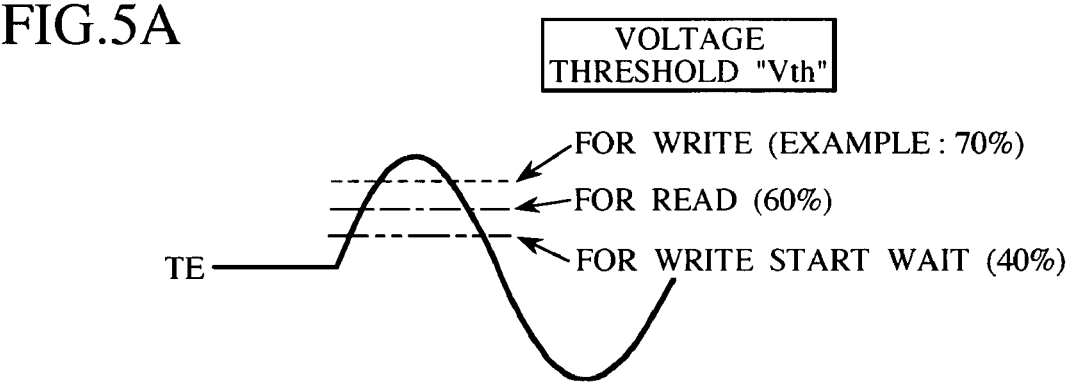
FIGS. 5A and 5B are diagrams showing an example of off-tracking detection threshold levels applied according to a particular operation mode.
Figure 5B:
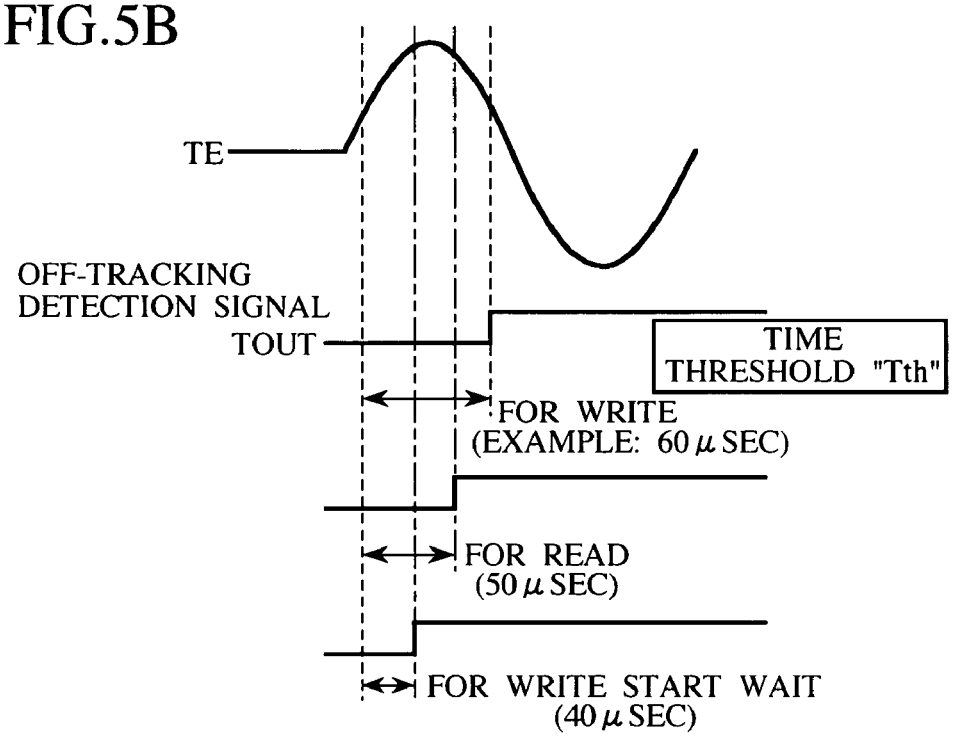

FIGS. 5A and 5B are diagrams showing an example of off-tracking detection threshold levels applied according to a particular operation mode. FIG. 5A denotes the voltage threshold "Vth", and FIG. 5B denotes the time threshold "Tth". As shown in the figures, each threshold levels are changed according to the selected operation mode. For example, the threshold levels for the write operation are assigned a voltage "Vth" of 70% and a time "Tth" of 60 μsec, which are the largest of all three sets of threshold data. Also, the threshold levels for the read operation are assigned a voltage "Vth" of 60% and a time "Tth" of 50 μsec, and the write start waiting threshold levels are assigned a voltage "Vth" of 40% and a time "Tth" of 40 μsec, which are the smallest of the three sets of threshold data. Although a relationship in magnitude between the write threshold levels and the read threshold levels may inverse, the write start waiting threshold levels always remain small.

In the present embodiment, during off-tracking detection, if both conditions on the voltage threshold "Vth" and the time threshold "Tth" are satisfied in the particular operation mode (i.e., if both thresholds are exceeded), off-tracking is judged to have occurred. For simplified judgment, either the voltage threshold "Vth" or the time threshold "Tth" may be fixed at constant values independently of the operation mode.

As described above, according to the present embodiment, when off-tracking is detected using a tracking error signal, it is possible, by assigning smaller values as the write start waiting threshold levels independently of those of the read or write threshold levels, to reliably detect off-tracking during the moving time period from the end of the seek operation to the arrival at the starting position of the write operation, and hence to prevent the optical pickup from mistaking the starting position of the write operation when the pickup starts writing. Erroneous detection and erroneous writing in the disc management region of the disc, in particular, can be avoided and the fatal trouble resulting in the entire disc becoming unusable can be prevented from occurring.

While we have shown and described an embodiment in accordance with our invention, it is to be noted that the disclosed embodiment is susceptible of changes and modifications without departing from the scope of the invention. Therefore, we do not intend to be bound by the details shown and described herein, but intend to cover all such changes and modifications that fall within the ambit of the appended claims.

What is claimed is:

1. An optical disc device for recording data on a recordable optical disc, the device comprising:
    a spindle motor that rotates the optical disc;
    an optical pickup that irradiates the optical disc with laser light and detects the light reflected from the optical disc;
    a tracking error signal generator that generates a tracking error signal from a signal detected by the optical pickup;
    a tracking servo controller that controls tracking of the optical pickup on the basis of the tracking error signal; and
    a system controller that detects off-tracking by comparing the tracking error signal with a threshold level and turns off control operation of the tracking servo controller if the threshold level is exceeded,
    wherein the threshold level for off-tracking detection that the system controller applies during a time period from completion of seek operation to a start of movement of the optical pickup to a starting position of recording is set to be lower than a threshold level applied during a time period of data recording.

2. The optical disc device according to claim 1, wherein:
    the threshold level for off-tracking detection includes a voltage threshold level for comparing a voltage value of the tracking error signal, and a time threshold for comparing a span of a time for which the voltage value exceeds a predetermined voltage.

3. The optical disc device according to claim 2, wherein:
    the system controller includes a memory for storage of the threshold levels applied according to a particular operation mode.

4. A method for control of tracking during data recording on a recordable optical disc, the method comprising:
    acquiring a tracking error signal from light which is reflected from the optical disc;
    detecting off-tracking by comparing the acquired tracking error signal with a threshold level; and
    turning tracking servo control off if the threshold level is exceeded;
    wherein the off-tracking detection threshold level applied during a time period from completion of seek operation to a start of movement of an optical pickup to a starting position of recording is set to be lower than a threshold level applied during a time period of data recording.

5. The tracking control method according to claim 4, wherein:
    The threshold level for off-tracking detection includes at least either one of a voltage threshold level for comparing a voltage value of the tracking error signal, or a time threshold for comparing a span of a time for which the voltage value exceeds a predetermined voltage.

* * * * *